Figure 1:
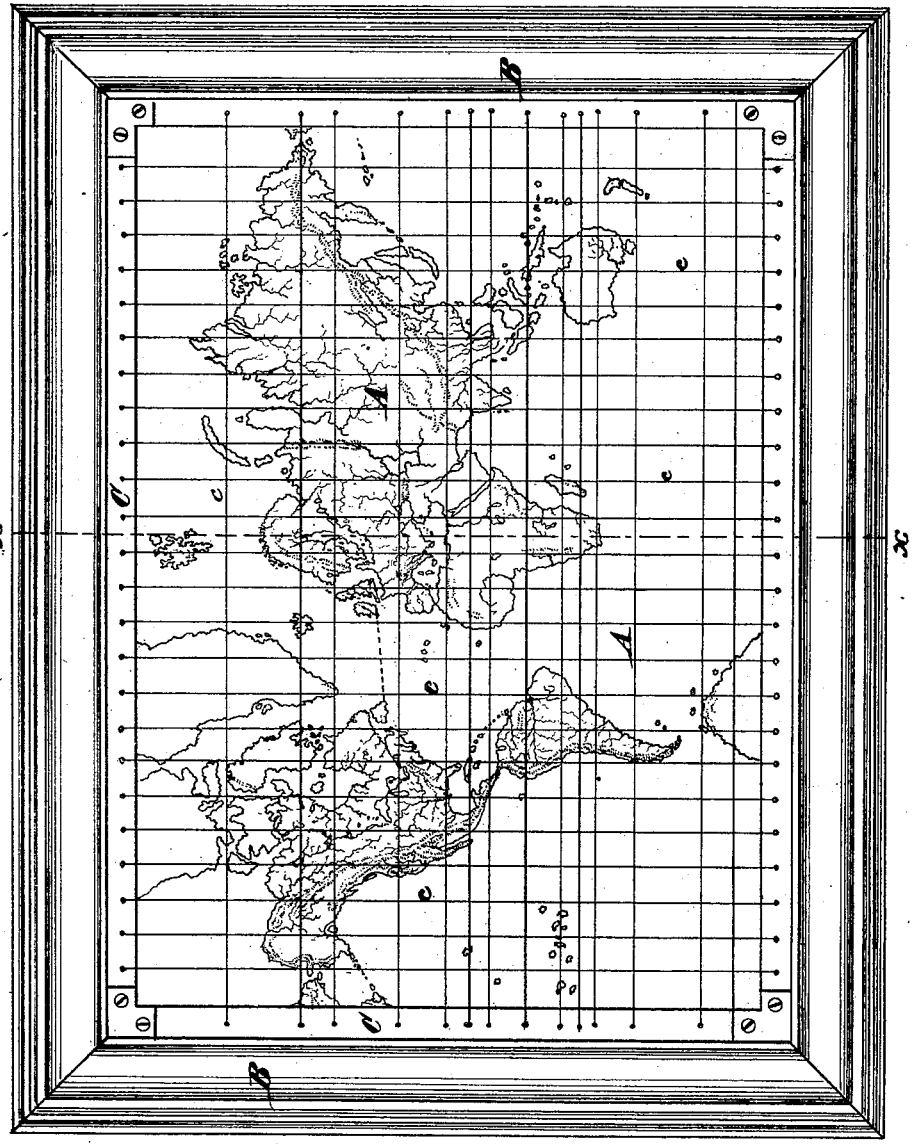

2 Sheets--Sheet 1.

G. E. JONES.
Geographical-Maps.

No. 155,449. Patented Sept. 29, 1874.

G. E. JONES.
Geographical-Maps.

No. 155,449.

2 Sheets--Sheet 2.

Patented Sept. 29, 1874.

UNITED STATES PATENT OFFICE.

GEORGE E. JONES, OF CINCINNATI, OHIO.

IMPROVEMENT IN GEOGRAPHICAL MAPS.

Specification forming part of Letters Patent No. 155,449, dated September 29, 1874; application filed August 19, 1874.

*To all whom it may concern:*

Be it known that I, GEORGE E. JONES, M. D., of Cincinnati, Hamilton county, State of Ohio, have invented a certain new and useful Improvement in Geographical Maps for Teachers and Students, of which the following is a specification:

My invention consists of a map in which the portions of the map illustrating oceans, seas, lakes, and other water-spaces are depressed or cut away, so as to admit of water being poured in, in order to exhibit water-spaces with real sheets of water, the water-beds being preferably so cut away, swaged, or otherwise formed as to represent, topographically, the ascertained depths and configuration, and so colored as to illustrate, when the water is out, the geological formation of the ocean-bed, seas, gulfs, lakes, &c. My invention further consists in the provision, within a suitable frame of the map, of a detachable frame carrying wires or cords representing, with accompanying figures, the degrees of latitude and longitude, ocean-currents, and the boundaries of the zones.

The object of my invention is to provide a map more entertaining and instructive than any yet provided for object-teaching, my improved map having the following advantages: First, the boundaries of the greater and lesser divisions of land and water and extent of water-spaces are illustrated by the presence of the natural fluid itself, and a more durable impression is made upon the mind of a scholar than by any other method. Second, the water is available for the amusement and lasting instruction of children or students in sailing miniature vessels in the actual element from country to country, laden with articles of commerce representing the trade of different countries, and may be made instrumental in showing the use of the mariner's compass on a vessel to illustrate navigation. Third, when not used as a water-map, it admits of being used as a wall or ordinary map. Fourth, the water being removable, the geological and topographical structure of water-beds and tracks of ocean telegraphic cables, &c., may be rendered visible. Fifth, the frame containing the lines of latitude, longitude, lines indicating direction of ocean-currents, winds, &c., being removable, opportunity is afforded for the recollection of the lines and degrees at any given location without the immediate presence of the wires or cords. Sixth, the map may be made of wood, raised metal, or other material, and admits of the topographical formation of the land-spaces being indicated by the natural formation of the earth's surface, and also admits of raised letters being used, and raised edges to give contour of boundaries, to teach the blind, and of the application to its surface of representations of animals and vegetation peculiar to the country in which they belong, or representations of vegetation, animals, fish, &c., peculiar to the water and water-beds in which they are introduced—in a word, physical geography.

Figure 2:
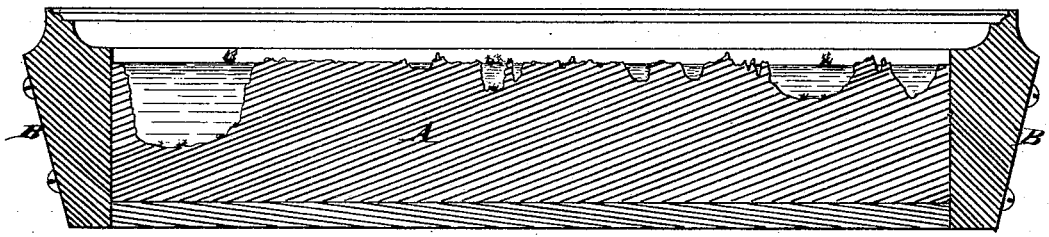
Figure 3:
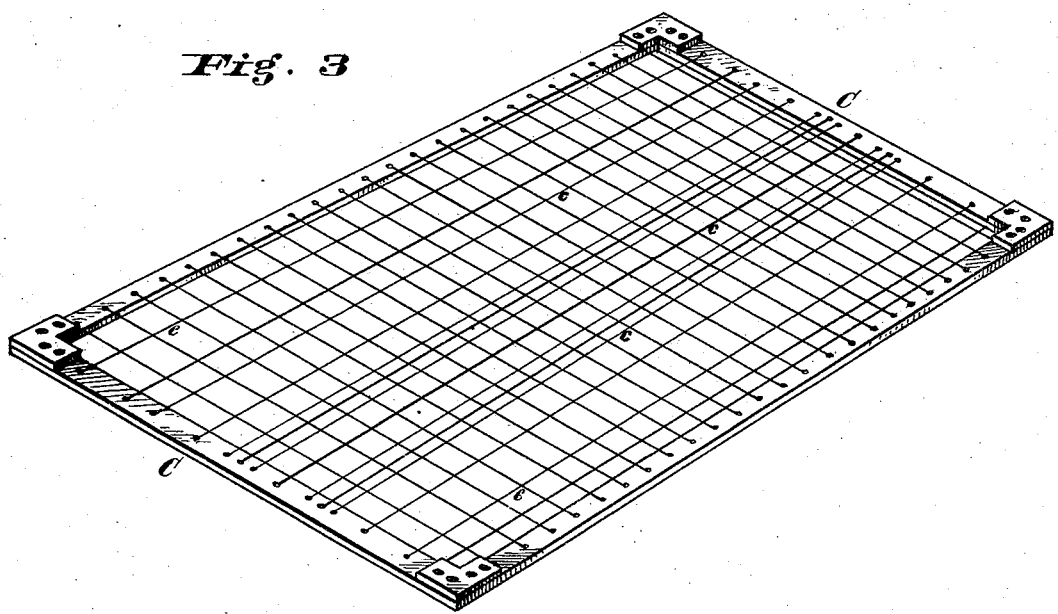

Figure 1 is a plan of my improved map. Fig. 2 is a cross-section of the same through line $x$ $x$. Fig. 3 is a perspective view of the detachable frame.

A is the body of the map, composed of material suitable for indicating undulating surfaces. B is the frame or case of the map; and C, the detachable frame. The body A may be of wood cut away, or of metal swaged to shape, or of any other suitable material. The parts of the body of the map at which seas, oceans, lakes, &c., are located, are cut or recessed below the surface, so as to admit of water or other fluid, colored or otherwise, being poured in the cavities so created, to represent such oceans, seas, lakes, &c., by the actual element, and the bottoms of such cavities in the body of the map may be so formed as to represent the topographical configurations of the water-beds. The bottoms of the water-beds may also be colored to give the differing appearance in color of water of different depths, or may be colored to represent the geological structure of the water-beds.

The land-spaces may be made, as heretofore, to represent the natural topography, and be otherwise formed, as hereinafter indicated.

The frame C carries the wires $c$, to indicate latitude, longitude, boundaries of zones, direction of winds, ocean-currents, &c., and it is made detachable for the purpose before indicated.

As it is simply desirable that the wires be detachable, it is obvious that they may be secured to sections of a frame, or even to pegs in the frame B, in place of all being secured in one removable frame.

I claim—

1. As a means of object-teaching in geography, a map in which the portions illustrating oceans, seas, lakes, and other water-spaces are depressed or cut away, so that water or other fluid may be poured therein, substantially in the manner and for the purpose specified.

2. In combination with the body A B of the map, the frame C or suitable support, carrying detachable wires or cords $c$, substantially as and for the purpose specified.

In testimony of which invention I hereunto set my hand.

GEO. E. JONES, M. D.

Witnesses:
EDGAR GROSS,
J. L. WARTMANN.